United States Patent
Li

(10) Patent No.: US 6,650,396 B2
(45) Date of Patent: Nov. 18, 2003

(54) METHOD AND PROCESSOR FOR STEREO CYLINDRICAL IMAGING

(75) Inventor: Ming Li, Shenzhen (CN)

(73) Assignee: Hytechnology, Inc., Baldwin Park, CA (US)

( * ) Notice: Subject to any disclaimer, the term of this patent is extended or adjusted under 35 U.S.C. 154(b) by 0 days.

(21) Appl. No.: 09/997,123

(22) Filed: Nov. 28, 2001

(65) Prior Publication Data

US 2002/0067465 A1 Jun. 6, 2002

Related U.S. Application Data

(60) Provisional application No. 60/251,123, filed on Dec. 4, 2000.

(51) Int. Cl.[7] .............................................. G03B 35/00
(52) U.S. Cl. ........................................... 352/58; 352/57
(58) Field of Search ............................ 352/61, 58, 57; 359/458; 353/7

(56) References Cited

U.S. PATENT DOCUMENTS

| | | | | |
|---|---|---|---|---|
| 3,107,577 A | * | 10/1963 | Adams | ......................... 352/70 |
| 4,547,050 A | * | 10/1985 | Collender | ..................... 352/43 |
| 4,549,208 A | | 10/1985 | Kamejima et al. | |
| 4,799,763 A | | 1/1989 | Davis et al. | |
| 4,951,150 A | | 8/1990 | Browning | |
| 4,965,844 A | | 10/1990 | Oka et al. | |
| 5,130,794 A | | 7/1992 | Ritchey | |
| 5,396,583 A | | 3/1995 | Chen et al. | |
| 5,704,061 A | | 12/1997 | Anderson | |
| 5,942,745 A | | 8/1999 | Kline et al. | |
| 5,963,664 A | | 10/1999 | Kumar et al. | |
| 5,964,064 A | * | 10/1999 | Goddard et al. | .................. 52/8 |
| 5,990,941 A | | 11/1999 | Jackson et al. | |
| 6,075,905 A | | 6/2000 | Herman et al. | |
| 6,195,471 B1 | * | 2/2001 | Larsen | ........................ 382/284 |
| 6,229,562 B1 | | 5/2001 | Kremen | |
| 6,230,167 B1 | | 5/2001 | Lipscomb et al. | |
| 6,252,603 B1 | | 6/2001 | Oxaal | |
| 6,268,611 B1 | | 7/2001 | Pettersson et al. | |
| 6,271,853 B1 | | 8/2001 | Oxaal | |
| 6,286,978 B1 | | 9/2001 | Tait et al. | |
| 6,421,174 B1 | * | 7/2002 | Ooshima et al. | ............. 359/457 |

* cited by examiner

Primary Examiner—Russell Adams
Assistant Examiner—D. Ben Esplin
(74) Attorney, Agent, or Firm—Beusse, Brownlee, Bowdoin & Wolter, PA; Enrique J. Mora

(57) ABSTRACT

Computerized method, processor and computer-readable medium are provided for stereoscopically and seamlessly imaging on a generally cylindrical screen. The method allows to configure imaging data for a plurality of selectable sub-screens encompassing the cylindrical screen. Each sub-screen includes a plurality of selectable strips axially extending relative to a corresponding sub-screen in the cylindrical screen. The method further allows to render two channels imaging data increments for each strip based on a parallax model with a reference line selectively rotatable to be in parallel alignment relative to each respective plane defined by each strip. The method allows to combine each imaging data increment corresponding to each strip in a respective sub-screen to generate stereoscopic imaging data for that respective sub-screen, and further combines each sub-screen imaging data to generate stereoscopic imaging data substantially encompassing the angular span of the cylindrical screen.

20 Claims, 5 Drawing Sheets

METHOD AND PROCESSOR FOR STEREO CYLINDRICAL IMAGING

This application claims the benefit of U.S. Patent Application serial No. 60/251,123 filed on Dec. 4, 2000.

BACKGROUND OF THE INVENTION

The present invention is generally related to three-dimensional imaging, and, more particularly, the present invention is directed to computerized techniques and processor for stereoscopically and seamlessly imaging on a generally cylindrical screen.

To project stereoscopic moving images, e.g., a movie, on a planar screen, it is known to use a parallax model to account for the change in the apparent relative orientation of objects when viewed from different positions. Unfortunately, known parallax models for projecting a stereo image on a planar screen do not work well for projecting moving images on a cylindrical screen. As used herein, stereo imaging refers to images that when processed by the brain of an observer create the illusion of rendering three-dimensional (3-D) objects.

In a basic parallax model, two cameras, slightly separated apart, are used to mimic each eye of a person, and generate two slightly different pictures for the left and right picture channels to be projected on the screen. See FIG. 1 for a representation of a typical parallax model 10 for projecting 3-D images on a planar screen 11. The line connecting the respective viewpoints of each camera, such as the left and right view points 12 and 14, is called a reference line 16, which is set generally horizontal and perpendicular relative to a view axis 18 that bisects the screen 11 relative to left and right view axes 20 and 22. In parallax model 10, the reference line is spatially fixed in the same direction relative to the view axis for each picture channel.

To project moving images on a cylindrical screen, it would be desirable to subdivide the complete screen into an appropriate number of sub-screens seamlessly joined, and then one could use the same number of projectors as the number of sub-screens to project such images on the cylindrical screen. As suggested above, known parallax models generally introduce undesirable distortion to the image when a plurality of sub-screens is used because each sub-screen would need a different direction for its respective reference line, in lieu of the fixed reference line provided by known planar parallax models. This results in image discontinuity between any two adjacent sub-screens, and that is why typical parallax models that use a fixed direction for the reference line would fail to render an aesthetically-pleasing image on a cylindrical screen.

In view of the foregoing discussion, it would be desirable to provide system and techniques for projecting 3-D moving images on a cylindrical screen free from distortion and discontinuities. For example, it would be desirable to subdivide the cylindrical screen into a plurality of sub-screens combinable to generate an image aesthetically pleasing to the observer. It would be further desirable to provide continuity of the image at each juncture of any two adjacent sub-screens. It would also be desirable to provide system and techniques that provide a cost-effective solution for playing stereo movies free of optical distortion on seamlessly connected cylindrical sub-screens comprising angles of up to 360 degrees.

BRIEF SUMMARY OF THE INVENTION

Generally, the present invention fulfills the foregoing needs by providing in one aspect thereof, a computerized method for stereoscopically and seamlessly imaging on a generally cylindrical screen. The method configures imaging data for a plurality of selectable sub-screens encompassing the cylindrical screen. Each sub-screen includes a plurality of selectable strips axially extending relative to a corresponding sub-screen in the cylindrical screen. The method further renders two channels of imaging data increments for each strip based on a parallax model with a reference line selectively rotatable to be in parallel alignment relative to each respective plane defined by each strip. The method combines each imaging data increment corresponding to each strip in a respective sub-screen to generate stereoscopic imaging data for that respective sub-screen, and further combines each sub-screen imaging data to generate stereoscopic imaging data substantially encompassing the angular span of the cylindrical screen.

The present invention further fulfills the foregoing needs by providing in another aspect thereof a computer-readable medium including instructions for causing a computer to process stereoscopic seamless imaging data for a cylindrical screen by:

arranging a cylindrical screen into N sub-screens, each sub-screen comprising M planar strips axially extending along a corresponding sub-screen;

rendering M increments of imaging data for each imaging channel, each increment of imaging data uniquely corresponding to a respective strip on each sub-screen; and combining each of the M increments of imaging data for each of the N sub-screens to seamlessly form cylindrical imaging data to be projected on the cylindrical screen, wherein M and N represent respective positive integer numbers.

In yet another aspect of the present invention, a stereoscopic cylindrical screen imaging method comprising the following actions is provided:

a) gathering an externally-derived three-dimensional scene model;

b) selecting a plurality of processing parameters selected from the group consisting of angular span of the cylindrical screen, a number of sub-screens for the cylindrical screen, and a number of axially-extending planar strips for each sub-screen;

c) providing a pair of computer-synthesized cameras at the respective end points of a reference line, with each camera providing a respective view of the three-dimensional model for each imaging channel;

d) positioning the mid-point of the reference line to substantially correspond with the center of the cylinder;

e) aligning the reference line to be generally parallel relative to the plane defined by a first strip of the sub-screen;

f) generating a stereoscopic increment of imaging data for the first strip of the sub-screen;

g) rotating the reference line together with the camera pair about the center of the cylinder to be in general parallel alignment relative to the plane defined by the next strip of the sub-screen;

h) generating a stereoscopic increment of imaging data for said next strip of the sub-screen;

i) iteratively continuing with steps g) and h) until imaging data has been rendered for each strip in each of the sub-screens;

j) combining each incremental imaging data to seamlessly form cylindrical imaging data for the complete cylindrical screen; and k) storing each sub-screen imaging data for additional processing.

In still another aspect of the present invention, a processor for stereoscopically and seamlessly imaging on a generally cylindrical screen is provided. The processor includes a module for configuring imaging data for a plurality of selectable sub-screens encompassing the cylindrical screen. Each sub-screen is made-up of a plurality of selectable strips axially extending (e.g., in a vertical direction) relative to a corresponding sub-screen in the cylindrical screen. A rendering-module is provided for rendering two channels of imaging data increments for each strip based on a parallax model with a reference line selectively rotatable to be in parallel alignment relative to each respective plane defined by each strip. A combining-module is configured to combine each imaging data increment corresponding to each strip in a respective sub-screen to generate stereoscopic imaging data for that respective sub-screen. The combining module is further configured to combine each sub-screen imaging data to generate stereoscopic imaging data substantially encompassing the angular span of the cylindrical screen.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION OVERVIEW

As suggested above, it is believed that presently available 3-D software applications for cinematic use are generally limited in their capabilities for providing image-rendering functions on cylindrical surfaces. In the stereoscopic projection of a movie on a cylindrical screen, the 3-D image needs to be rendered on curved surfaces with a directionally varying reference line. In one aspect of the present invention, a strip-dividing technique allows projecting 3-D moving images on a cylindrical screen free of distortion and discontinuities.

Figure 1:
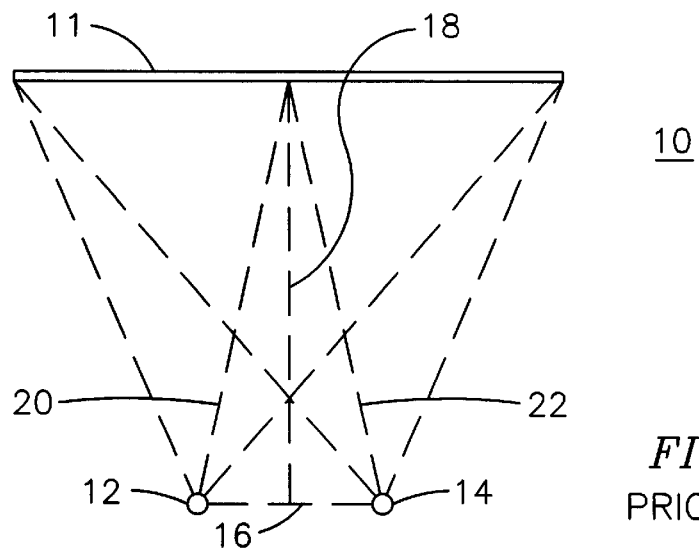
FIG. 1 illustrates a representation of a typical parallax model for projecting 3-D images on a planar screen.
Figure 2:
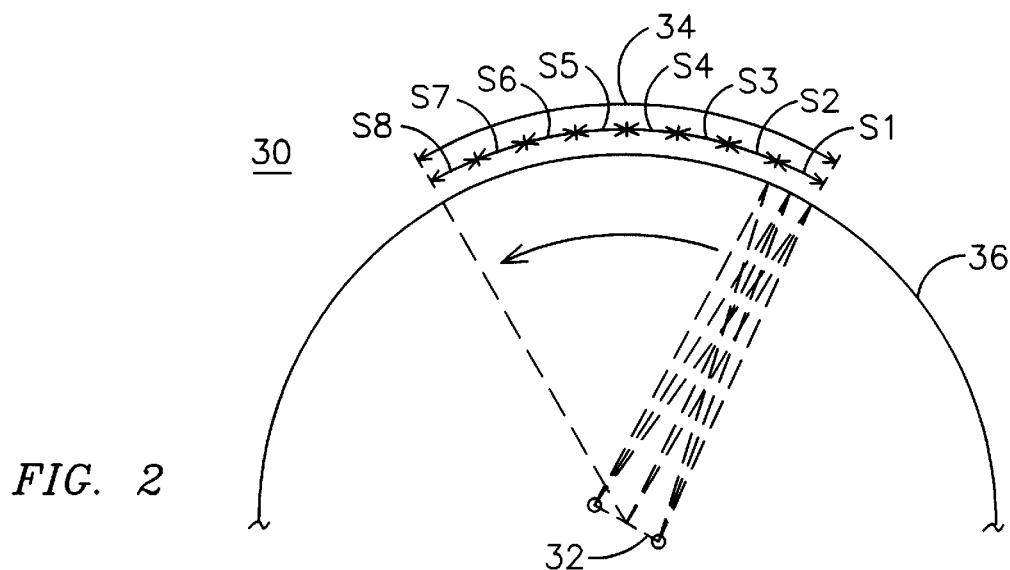
FIGS. 2 and 3 illustrate respective exemplary parallax-based arrangements in accordance with aspects of the present invention for constructing seamless imaging data for a cylindrical screen.
Figure 3:
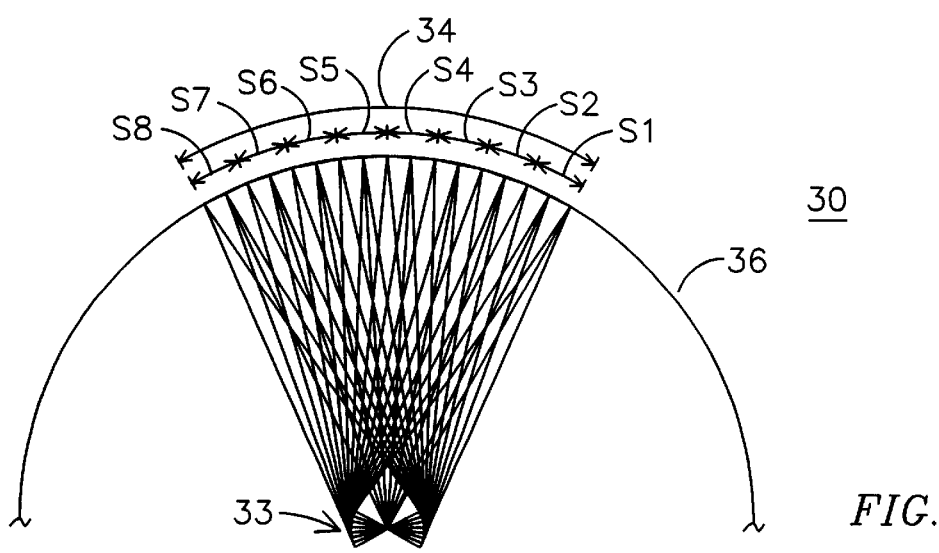

For projecting 3-D moving images on a cylindrical screen, it is proposed to use an improved parallax-based model that utilizes a reference line with a selectively variable direction instead of a fixed direction. This would allow seamless 3-D projection of moving images on a cylindrical screen that, for example, may have angular span in excess of 180 degrees. See FIGS. 2 and 3 for respective exemplary parallax-based arrangements 30 in accordance with aspects of the present invention. In particular, FIG. 2 illustrates a schematic to assist the reader visualize a reference line 32 directed to a single strip S1 of an exemplary sub-screen 34, part of a larger cylindrical screen 36. As shown in FIG. 2, strip S1 represents one strip out of a plurality of strips, e.g., strips S1, S2 . . . S8 that collectively make up sub-screen 34. FIG. 3 illustrates a schematic to assist the reader visualize a set of reference lines 33 for each strip S1, S2 . . . S8 in sub-screen 34. The set of reference lines is generated for each sub-screen by dynamically selecting an appropriate angle of rotation for each reference line 32.

Conceptually, one may render an image on cylindrical screen 36 through a camera whose viewpoint is just at the center of the cylinder. Thus, each vertical line of the cylinder would correspond to a certain view direction of the camera, and different vertical lines would correspond to different view directions. It will be appreciated that for stereo imaging, one would use two cameras instead of one, and the reference line 32 for the pair of cameras would change its direction, as illustrated in FIG. 3, based on the respective view directions for each vertical line of the cylinder, and perpendicular to the view direction. It will be further appreciated by those skilled in the art, that such cameras need not represent physical cameras since in the field of computerized imaging they would represent computer-synthezisable or virtual cameras. That is, computer-based tools functionally equivalent to a physical camera in the sense of assisting the movie producer to visualize a scene, while or prior to rendering a scene. The techniques of the present invention insure imaging continuity at each juncture of any two adjacent sub-screens. Further, such techniques provide a solution for playing stereo movies on seamlessly connected cylindrical sub-screens comprising angles of up to 360 degrees.

Figure 4:
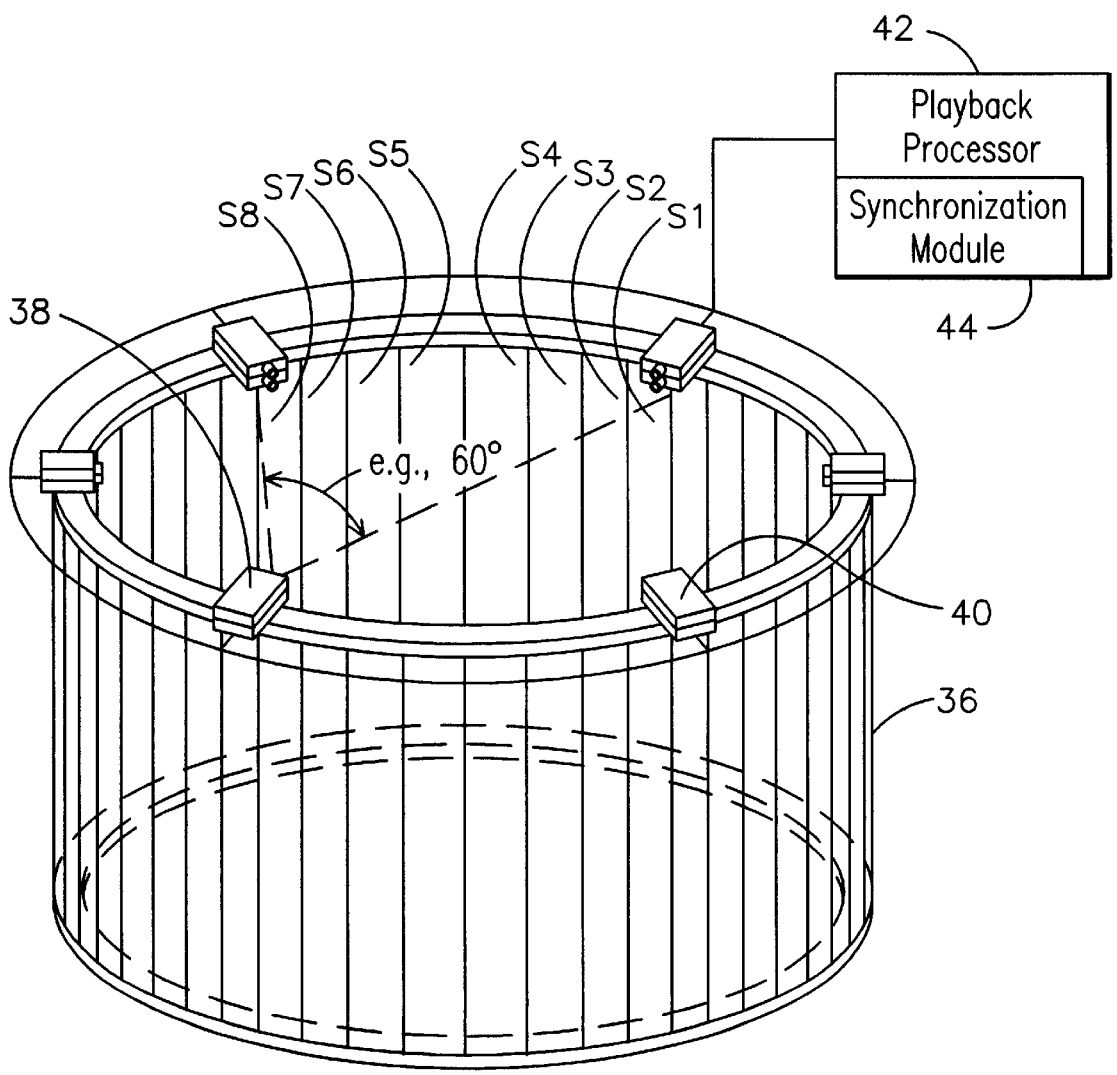
FIG. 4 illustrates an exemplary cylindrical screen in combination with a projector system responsive to a playback processor that may be used to playback a stereo movie on the seamlessly connected sub-screens.

As suggested above, and better appreciated in FIG. 4, one aspect of the present invention proposes to divide the cylindrical screen surface 36, for purposes of configuring and processing the imaging data, into a plurality of sub-screens made up of a plurality of axially-extending and relatively narrow planar strips, e.g., vertical strips S1, S2 . . . S8, and render an image on each strip from projector pairs, such as projector pairs 38 and 40, with reference lines generally parallel to the plane in which the corresponding strip lies. It will be understood that the actual cylindrical screen where the imaging data is projected need not be physically subdivided or partitioned into sub-screens or strips since such subdividing or partitioning refers to the computer-based techniques used for rendering and processing the imaging data to be projected on the cylindrical screen. As illustrated in FIG. 4, for a cylindrical screen comprising 360°, assuming six sub-screens each encompassing 60°, a set of six x two projectors, (e.g., double-stacked projectors) responsive to a playback processor 42 may be used to play a stereo movie on the seamlessly connected sub-screens.

Figure 5:
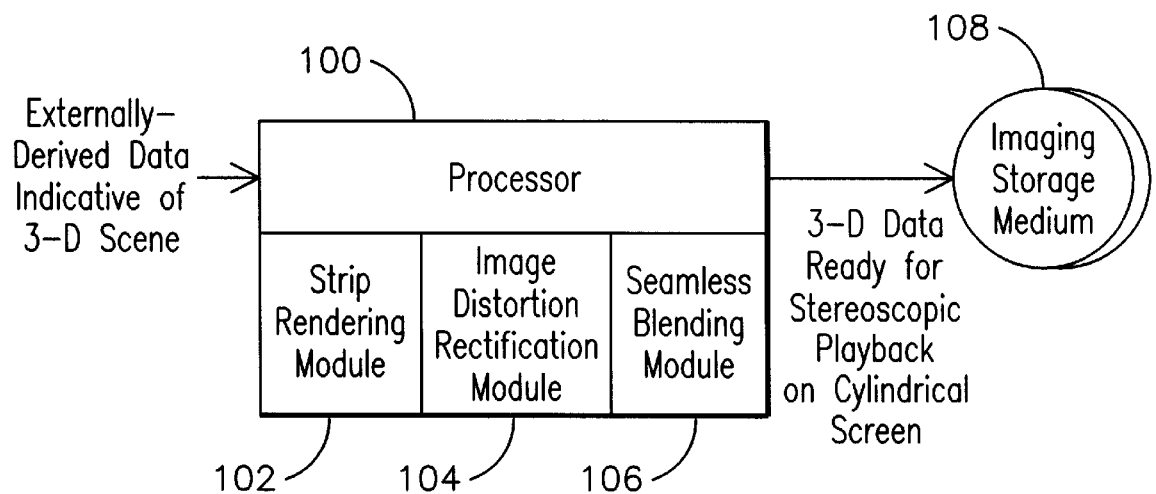
FIG. 5 is a block diagram schematic of a processor configured to render and combine during a movie-producing stage imaging data increments for each narrow strip into several larger images for each sub-screen of the cylindrical screen.

As illustrated in FIG. 5 and described in greater detail below, a processor 100 includes a module 102 configured to render and combine the imaging data for each narrow strip into several larger images for each sub-screen. That is, processor 100 represents a device used when the movie is being produced configured to receive externally-derived digitized data representative of a 3-D scene, and further configured to process such data to supply 3-D data for storage in a suitable imaging storage medium 108, e.g., film, video cassette, or computer-readable device, such as a magnetic or optical-based disc, random access memory (RAM), flash memory, etc., ready for playback onto a cylindrical screen using a projection system responsive to playback processor 42 (FIG. 4) when the movie is eventually played in front of an audience.

It will be appreciated that because lens-based stereo cameras presently cannot change their reference line in a single imaging frame, it is believed that, in one exemplary implementation, the techniques of the present invention may be more suitable for movies made with computerized three-dimensional (3-D) applications, such as 3-D imaging, graphics, animations, etc.

Image Distortion Rectification

As will be appreciated by those skilled in the art, standard projectors can project images on planar screens without distortion or warping. However, projection of images on a cylindrical screen introduces distortion. To avoid such a distortion, processor 100 includes a processor module 104 configured to perform digital processing to rectify such images. In one exemplary embodiment, module 104 comprises software code configured to perform image distortion rectification. An exemplary workflow may be as follows: Set 2×N computer-synthezisable cameras at respective positions and directions as the projectors in the real cinema, where N represents an integer number corresponding to the number of sub-screens. For each frame in the movie to be produced, provide sub-screen images rendered by a movie-producing processor (e.g., processor 100 in FIG. 5) configured to perform the improved parallax model used for rendering images on a curved surface, as described in the context of FIGS. 2 and 3. Map such images to correspond to the surface of a computer-synthezisable cylinder with dimensions like the real screen, e.g., screen height, radius of curvature, etc. Generate or re-render sub-screen images based on the cylinder dimensioned like the real screen. Save the re-rendered sub-screen images. This re-rendering process makes these images distort in an opposite way to the original distortion. As will be appreciated by those skilled in the art of computer graphics, one may then use a suitable mapping technique, e.g., texture-mapping, to map the originally rendered sub-screen onto the computer-synthezisable cylinder dimensioned like the real screen to supply imaging data free from the undesirable distortion that otherwise would have occurred during projecting time, if the re-rendering operation was not performed.

Multi-Screen Seamless Blending

The effect of stereo cylindrical imaging requires the ability to seamlessly move images across several sub-screens, which are relatively close to the audience. That is, the displayed images on each sub-screen should be blended seamlessly.

The present invention in another aspect thereof, proposes method and system to make digital images that are appropriately overlapped and attenuated across adjacent sub-screens using a suitable attenuation function for blending purposes. Accordingly, processor 100 includes a module 106 configured to seamlessly blend images across adjacent sub-screens, as described in greater detail below. As will be appreciated by those skilled in the art, the attenuation function can be experimentally and/or analytically derived to match the specific characteristics of any given imaging application.

Figure 8:
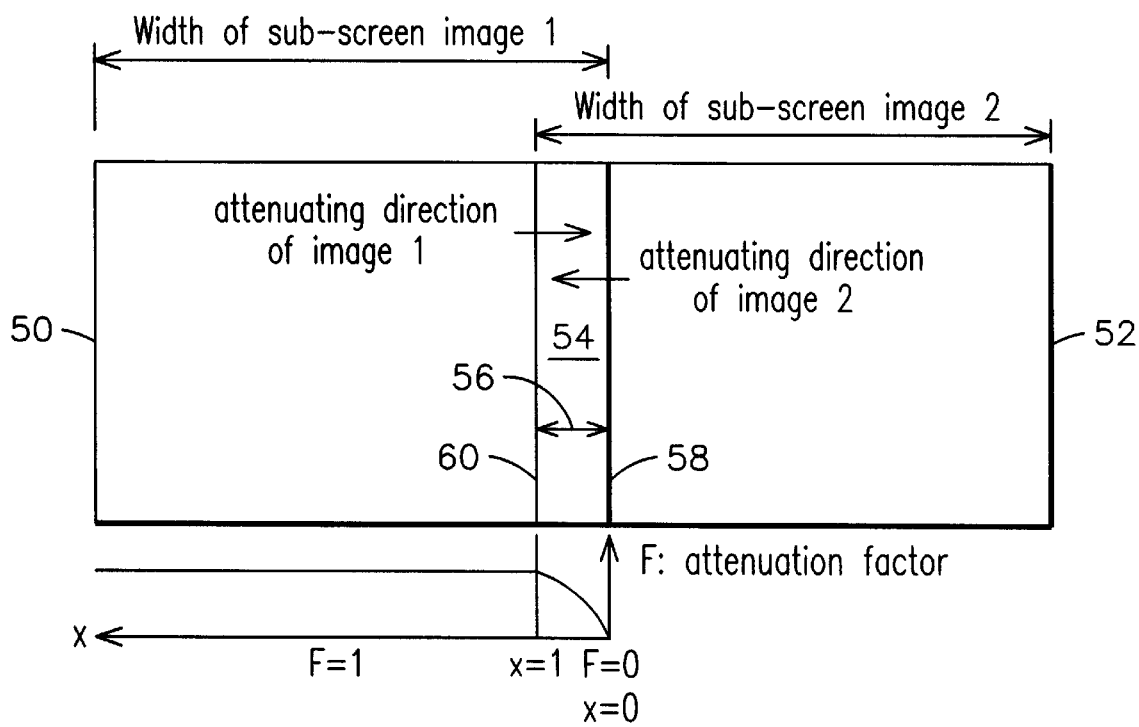
FIG. 8 illustrates two adjacent sub-screen images that may overlap during projecting time but in accordance with aspects of the present invention are seamlessly blended using a predefined attenuation function to ensure imaging continuity at each juncture of any two adjacent sub-screens.

By way of example, as shown in FIG. 8, any two adjacent sub-screen images 50 and 52 may overlap during projecting time over an overlapping area 54. In one exemplary embodiment, the overlapping area may comprise a width (represented by line 56) of about 1/10 in. In the area overlapped with the two images, the red, green, and blue hue components of each pixel will be multiplied by a varying weighing or attenuating factor, generally not greater than 1. The value of the weighing factor is based on the attenuation function. Assuming a weighing factor of less than one and in the absence of any overlap, the pixels would appear dimmer. In one exemplary embodiment, the more each pixel is situated near an edge of the image with higher image overlap, the less the value of the factor is. That is, the more attenuation would be provided for pixels in areas of relatively higher overlap. For example, the attenuation factor is set to zero for pixels situated essentially at an edge or boundary (e.g., edge 58 in FIG. 8) of the area influenced the most by the overlap of the two adjacent sub-screens. Conversely, the more any pixel is situated near an edge (e.g., edge 60) of the area being least influenced due to the overlap of the two adjacent sub-screens, the greater the value of the factor is. For example, the factor is set to one for pixels essentially at the edge of the area being influenced the least due to the overlap of the two adjacent sub-screens. We call this factor attenuation factor, since it selectively makes the pixel dimmer. Once the two images are projected on the screen, the intensity of the pixels in the overlapped area are contributed by the two images, but because appropriate attenuation has been made, the picture in the overlapped area looks no brighter or dimmer than any other area on the screen. As suggested above, the attenuation or weighing factor may be based on a predefined mathematical function:

$$F=f(x)$$

where F represents the value of the attenuation factor, x represents the horizontal distance from a side edge or boundary of the image, e.g., edge 58. In one exemplary embodiment, $f(x)=0$, for pixels positioned just at the side edge 58 of the image;

$f(x)=1$, for pixels positioned up to edge 60 of the overlapped area; and $0<f(x)<1$, otherwise.

Experimental data has demonstrated that the function $f(x)$ is generally not linear. It will be appreciated that instead of using a mathematical function for obtaining the attenuation factor, one could provide a look-up table for storing the numerical attenuation values appropriate for a given application.

It will be appreciated that the aspects of the present invention discussed above are generally performed by processor 100 (FIG. 5) prior to playback. That is, the processing of reference lines suitable for each corresponding sub-screen, strip combining, image attenuating and rectifying. Each frame would have been processed by the methods described above, and would be ready for use when playback is performed by a playback system. In such embodiment, all calculating and processing is performed at the time of producing the movie, not necessarily at playback time. It will be further appreciated that the present invention is not limited to a film projector environment, since it could be used in a digital (non-film) projector environment. In this case, the digital projectors would be driven by playback processor 42 (FIG. 4) loaded with appropriate playback software. Playback processor would include a synchronization module 44 configured to synchronize the projectors with each other, as well as with other theatre devices that may enhance the overall cinematic experience, such as sound effects, smoke and fog generating devices, stroboscopic lights, touching and vibration effects through under-seating assemblies, etc. As suggested above, the stereoscopic image can be played by either a computer-based projector system or by standard cinematograph projectors.

Seamless Linear Incremental Rendering (S.L.I.R.)

As suggested above, processor 100 is loaded with SLIR imaging software for rendering and combining incremented cinematographic documents in the form of linear strips which playback processor 42 (FIG. 4) can then project from multiple projection devices over a 360 degrees cylindrical screen allowing the viewer to be completely surrounded and view a seamless 3-dimensional image (e.g., through standard polarization glasses, etc.) in all directions from any viewpoint allowing substantial cinematic immersion to the viewer.

The SLIR software, which may be configured for film or digital format for producing stereoscopic images to be eventually projected on a cylindrical screen, may be utilized to create seamless stereoscopic images that freely move across the cylindrical screen. The SLIR software allows for dividing the screen into the proper number of linear increments and for recomposing the linear increments and move between such graphic increments to create a 3-dimensional seamless single image on the cylindrical screen. This allows for combining the images from multiple projection devices into a single combined image formatted to appear 3-dimensional on the cylindrical screen when viewed through the polarized glasses.

Figure 6:
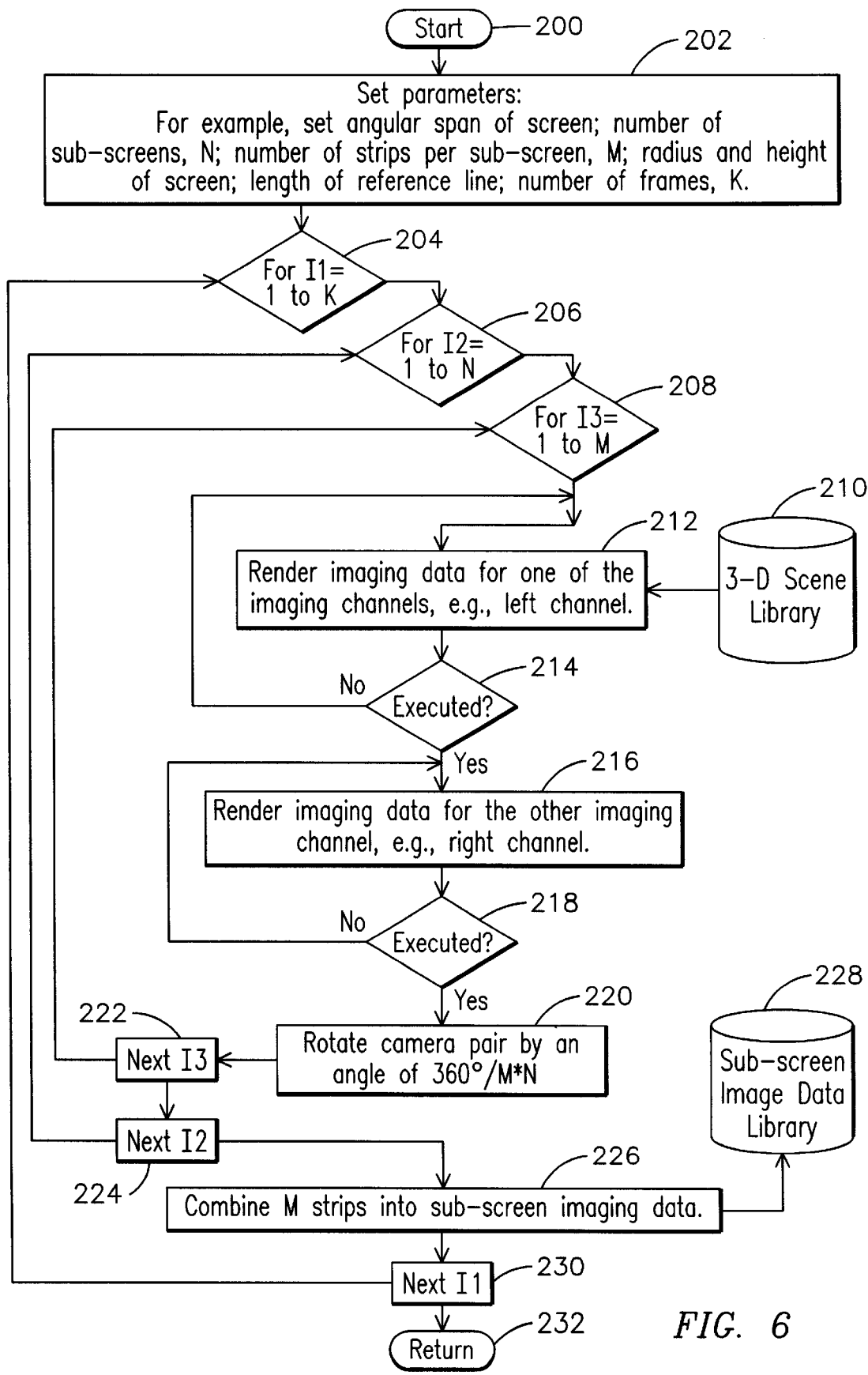
FIG. 6 is a flow chart illustrating an exemplary imaging data flow using a stereoscopic parallax model for rendering on a cylindrical surface in accordance with aspects of the invention.

As illustrated in the flow chart of FIG. 6, in operation, exemplary actions for using a parallax model and rendering images on a curved surface may comprise:

Loading an externally-derived 3-D scene model, which may be generated from commercially available 3-D animation or imaging software, and may be stored in a database 210 including a library of 3-D scene models.

As represented in block 202, set up a plurality of operational parameters. For example, set:

Angular span of the screen: e.g., 180, 240, 300, or 360 degrees;

Number of sub-screens, N. For the 360 degree case, one may let N=6;

Number of strips per sub-screen, M. In one exemplary embodiment, one may choose to make 15 strips per sub-screen, thus, the total number of strips would be M*N strips;

Radius and height of screen; and

Length of reference line, or distance between two eyes.

Setting up location and direction of each camera pair in a 3-D scene. For example, for determining viewer's position and view direction in a 3-D scene:

Provide a pair of computer-synthesized cameras each with a respective viewpoint at two endpoints of the reference line; and Select, for example, the mean point of the reference line at the center of a computer-synthesized cylinder dimensioned as the real screen, so as to direct or project to an area on the cylinder, corresponding to the size of a strip, with the left and right view axes intersecting at the surface of the cylinder.

Strip Rendering

For each frame in the movie to be made, strip-rendering module 102 is configured to perform the following:

For each of the two cameras, render the 3-D scene through the area of the first strip. As represented by blocks 212 and 216, generate a two-strip image, one for the left imaging channel, and another for the right imaging channel;

As represented by block 220, rotate the camera pair by an angle of about 360/(M*N) degrees, around the center of the cylinder;

Direct or align, the two cameras relative to an area corresponding to the next strip, and render an incremental image on that strip;

Generate the next two-strip image;

As represented by blocks 222 and 224, repeat this operation until all the M*N strip images are rendered. That is, continue until a frame of a scene of the movie is finished; and Continue with the remaining frames.

Strip Combining

For each frame in the movie, do the following:

As represented by block 226, combine M strip images into each sub-screen image. Note, that there are 2N sub-screen images in each frame. Also note that in an ideal case, the width of each strip could be as narrow as one pixel, and this would constitute single-line strip dividing. However, because of the relatively large number of calculations involved, under presently available technology, this may not be very practical.

As will be understood by those of ordinary skill in the art, the physical properties of different projectors and films are usually slightly different from one another. It is virtually impossible to make them exactly equal. The overlapping and attenuation techniques in accordance with aspects of the present invention will make any each sub-screen picture to gradually blend with the adjacent sub-screen picture. By using the proposed techniques, one can avoid the undesirable effects that would arise when such different physical properties change abruptly from one sub-screen picture to adjacent ones. As suggested above, in one exemplary embodiment, the sub-screen seamless blending includes the following exemplary actions: attenuation provided by module 106 (FIG. 5) at movie-producing time based on the attenuation function or look-up table that may be stored in module 106, and overlapping a predefined width (e.g., about 1/10 in) between adjacent sub-screens at movie-projecting time. It will be understood that the present invention is not limited to any specific overlapping width.

Figure 7:
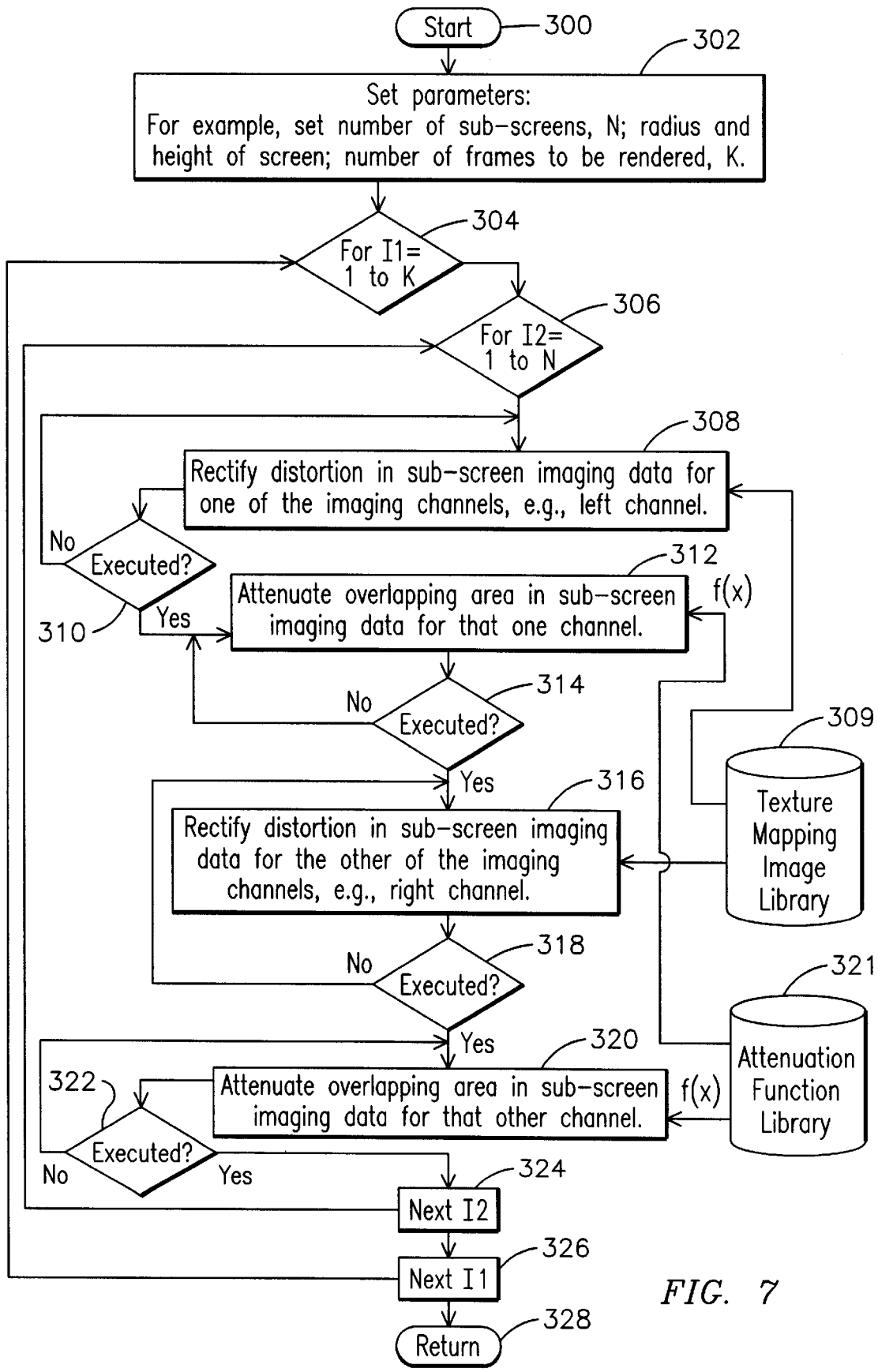
FIG. 7 is a flow chart illustrating an exemplary imaging data flow for rectifying distortion that could otherwise occur when projecting images onto a cylindrical surface and for performing seamless blending across adjacent sub-screens in accordance with other aspects of the invention.

FIG. 7 is a flow chart illustrating an exemplary imaging data flow for rectifying distortion that could otherwise occur when projecting images onto a cylindrical surface and for performing seamless blending across adjacent sub-screens in accordance with other aspects of the invention. Subsequent to start 300, block 302 allows to set parameters such as angular span of the screen: e.g., 180, 240, 300, or 360 degrees; number of sub-screens, N; radius and height of screen; and the number of frames, e.g., K, to be rendered. As represented by block 308, one may retrieve a desired texture mapping function from a database 309 to rectify distortion in sub-screen imaging data for one of the imaging channels, e.g., the left imaging channel. As represented by block 312, the attenuation function, such as may be stored in a database 321, is applied to appropriately attenuate the overlapping area between adjacent sub-screens. As represented by blocks 316 and 320, rectification of image distortion and attenuation of sub-screen imaging data may then be performed for the other imaging channel, e.g., the right imaging channel. As represented by blocks 324 and 326, the process of rectification of image distortion and attenuation in the overlapping area between adjacent sub-screens is iteratively repeated for each imaging frame in each sub-screen until each sub-screen imaging data has been processed, prior to return 328.

Brief Recapitulation of Image Processing

As discussed above, the inventor of the present invention has developed innovative algorithms such as may be performed in respective processor modules loaded with respective software code for implementing the various aspects of the present invention, for example:

Processor module loaded with software code for implementing improved parallax model for rendering 3-D images on curved surfaces, e.g., a cylinder;

Processor modules respectively loaded with software code for performing image distortion rectification and seamless blending;

Processor module loaded with synchronization playback software code, such as may be used for controlling a computerized projector system during playback.

Exemplary Output Data Formats

The imaging output during the movie-generating stage may comprise a stream of digital image files, e.g., TARGA bit-mapped files or Tag Image File Format (TIFF) files, one file per frame for each channel (left and right channels), and sub-screen.

For example, a 10 minute movie for a 360 degree screen may comprise about 10*60*25*N*2=30,000 imaging files, where 60 represents the number of seconds in a minute;

25 represents an exemplary number of frames per second; and

N represents the number of sub-screens, for example, a 360 degree screen may have N=6

2 represents the number of stereoscopic imaging channels, one for the left imaging channel, and another for the right imaging channel.

As suggested above, for a film-based projector, these image files may be printed on standard 35 mm/70 mm film via a suitable film recorder.

For computer-based projector, these image files may be converted to a suitable digital format, e.g., Audio Video Interleaved (AVI) format.

Playback System

As suggested above, it will be appreciated that the cylindrical stereo imaging system would use a playback system at the cinema. For a 360-degree cinema, this system includes N pairs of film-based projectors or computer-based projectors. In one exemplary embodiment, each projector pair may be positioned along the upper edge of the screen, and directed to the opposite side of the screen, and separated by 360/N degrees.

In a film-based projector environment, each of the 2N projectors are synchronized with one another using projector synchronization techniques well-understood by those skilled in the art. In a computer-based projector environment, a respective computer controller running synchronization playback software would drive each projector. Each controller and playback software may be synchronized with each other using for example a local area network or any other technique for communicating data among multiple devices. The synchronization playback software would be loaded in a synchronization module 44, such as may be part of playback processor 42 (FIG. 4). The movie files would be stored in each computer controller in a file in suitable format, such as AVI files, and would constitute input data of the synchronization playback software. It will be appreciated that the synchronization playback software allows for sending images to each projector at a rate of about 25 frames (one image) per second. In the 360-degree case, there are 2N copies or instances of synchronization playback software running on 2N computers, driving 2N projectors, each synchronized to one another. Except as noted above, the film and associated film projector, or the computer-based projector would comprise standard projection equipment.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules. While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A computerized method for stereoscopically and seamlessly imaging on a generally cylindrical screen, the method comprising:

configuring imaging data for a plurality of selectable sub-screens encompassing the cylindrical screen each sub-screen comprising a plurality of selectable strips axially extending relative to a corresponding sub-screen in the cylindrical screen;

rendering two channels of imaging data increments for each strip based on a parallax model with a reference line selectively rotatable to be in parallel alignment relative to each respective plane defined by each strip;

rectifying the imaging data for each corresponding sub-screen by re-rendering said imaging data relative to a computer-synthesized cylinder configured as the cylindrical screen, and texture-mapping the originally rendered sub-screen imaging data on the computer-synthesized cylinder to generate new sub-screen imaging data substantially free of distortion;

combining each imaging data increment corresponding to each strip in a respective sub-screen to generate stereoscopic imaging data for that respective sub-screen; and combining each sub-screen imaging data to generate stereoscopic imaging data substantially encompassing the annular span of the cylindrical screen.

2. The stereoscopic imaging method of claim 1 further comprising seamlessly blending imaging data between adjacent sub-screens by applying, during an imaging-production stage, a predefined attenuation function over an area selected for overlapping between any two adjacent sub-screens.

3. The stereoscopic imaging method of claim 2 further comprising, during a playback stage, overlapping the two adjacent sub-screens over the selected area so that pixels in that area are selectively attenuated based on attenuation values determined by the applied attenuation function.

4. A computerized stereoscopic imaging method comprising:

configuring a cylindrical screen into N sub-screens, each sub-screen comprising M planar strips axially extending along a corresponding sub-screen;

positioning at each end point of a reference line a respective computer-synthesized camera, each providing a respective field view for each imaging channel;

rendering M increments of imaging data for each imaging channel, each increment of imaging data uniquely corresponding to a respective strip on each sub-screen; and combining each of the M increments of imaging data for each of the N sub-screens to seamlessly form cylindrical imaging data to be projected on the cylindrical screen, wherein M and N represent respective positive integer numbers.

5. The imaging method of claim 4 wherein the rendering of the M increments of imaging data for each sub-screen is based on a parallax model using the reference line with each computer synthesized camera, said reference line selectively rotatable to be in parallel alignment relative to each respective plane defined by each strip in a corresponding sub-screen, and wherein selective rotation of the reference line comprises incrementally rotating the reference line by an angle based on the following equation:

$$\frac{\text{Cylindrical\_Span}}{M*N},$$

wherein "Cylindrical Span" represents the angular span of the cylindrical screen.

6. A computerized stereoscopic imaging method comprising:

configuring a cylindrical screen into N sub-screens, each sub-screen comprising M planar strips axially extending along a corresponding sub-screen;

rendering M increments of imaging data for each imaging channel, each increment of imaging data uniquely corresponding to a respective strip on each sub-screen;

re-rendering imaging data originally rendered for each imaging channel, said re-rendering performed relative to a computer-synthesized cylinder configured as the cylindrical screen, and texture-mapping the originally rendered sub-screen imaging data to generate new sub-screen imaging data substantially free of distortion; and combining each of the M increments of imaging data for each of the N sub-screens to seamlessly form cylindrical imaging data to be projected on the cylindrical screen, wherein M and N represent respective positive integer numbers.

7. The imaging method of claim 4 further comprising seamlessly blending imaging data between adjacent sub-screens by applying, during an imaging-production stage, a predefined attenuation function over an area selected for overlapping between any two adjacent sub-Screens, and, during a playback stage1 overlapping the two adjacent sub-screens over the selected area so that pixels in that area are selectively attenuated based on attenuation values determined by the applied attenuation function.

8. A stereoscopic cylindrical screen imaging method comprising:

a) gathering en externally-derived three-dimensional scene model;

b) selecting a plurality of processing parameters selected from the group consisting of angular span of the cylindrical screen, a number of sub-screens for the cylindrical screen, and a number of axially-extending planar strips for each sub-screen;

c) providing a pair of computer-synthesized cameras at the respective end points of a reference line, with each camera providing a respective view of the three-dimensional model for each imaging channel;

d) positioning the mid-point of the reference line to substantially correspond with the center of the cylinder;

e) aligning the reference line to be generally parallel relative to the plane defined by a first strip of the sub-screen;

f) generating a stereoscopic increment of imaging data for the first strip of the sub-screen;

g) rotating the reference line together with the camera pair about the center of the cylinder to be in general parallel alignment relative to the plane defined by the next strip of the sub-screen;

h) generating a stereoscopic increment of imaging data for said next strip of the sub-screen;

i) iteratively continuing with steps g) and h) until imaging data has been rendered for each strip in each of the sub-screens;

j) combining each incremental imaging data to generate1 imaging data for each sub-screen; and k) storing each sub-screen imaging data for additional processing.

9. The imaging method of claim 8 wherein the additional processing comprises re-rendering the stored sub-screen imaging data to generate new sub-Screen imaging data substantially free of distortion.

10. The imaging method of claim 9 wherein said re-rendering comprises:

rendering the three-dimensional scene model relative to a computer-synthesized cylinder configured as the cylindrical screen;

providing N computer-synthesized cameras, wherein each camera has a field of view configured to correspond to the field of view of each projector to be used for the cylindrical screen, and wherein N is an integer indicative of the number of sub-screens;

mapping each frame of the originally rendered imaging data of a first imaging channel for each sub-screen on the computer-synthesized cylinder, mapping each frame of the originally rendered imaging data of a second imaging channel for each sub-screen on the computer-synthesized cylinder; and storing each re-rendered sub-screen imaging data for additional processing.

11. The imaging method of claim 8 wherein said additional processing of the re-rendered sub-screen imaging data comprises seamlessly blending imaging data between adjacent sub-screens by applying, during an imaging-production stage, a predefined attenuation function over an area selected for overlapping between any two adjacent sub-screens, and, during a playback stage, overlapping the two adjacent sub-screens over the selected area so that pixels in that area are selectively attenuated based on attenuation values determined by the applied attenuation function.

12. A processor for stereoscopically and seamlessly imaging on a generally cylindrical screen, the processor comprising:

a module for configuring imaging data for a plurality of selectable sub-screens encompassing the cylindrical screen, each sub-screen comprising a plurality of selectable strips axially extending relative to a corresponding sub-screen in the cylindrical screen;

a rendering-module for rendering two channels of imaging data increments for each strip based on a parallax model with a reference line selectively rotatable to be in parallel alignment relative to each respective plane defined by each strip;

a rectifier module configured to rectify the imaging data for each corresponding sub-screen by re-rendering said imaging data relative to a computer-synthesized cylinder configured as the cylindrical screen, and texture-mapping the originally rendered sub-screen imaging data on the computer-synthesized cylinder to generate new sub-screen imaging data substantially free of distortion; and a combining-module for combining each imaging data increment corresponding to each strip in a respective sub-screen to generate stereoscopic imaging data for that respective sub-screen, the combining module further for combining each sub-screen imaging data to generate stereoscopic Imaging data substantially encompassing the angular span of the cylindrical screen.

13. The processor of claim 12 further comprising a module for seamlessly blending imaging data between adjacent sub-screens by applying, during an imaging-production stage, a predefined attenuation function over an area selected for overlapping between any two adjacent sub-screens.

14. The processor of claim 13 further comprising a playback processor configured to overlap during a playback stage the two adjacent sub-screens over the selected area so that pixels in that area are selectively attenuated based on attenuation values determined by the applied attenuation function.

15. A computer-readable medium including instructions for causing a computer to process stereoscopic seamless imaging data for a cylindrical screen by:

arranging cylindrical screen into N sub-screens each sub-screen comprising M planar strips axially extending along a corresponding sub-screen;

positioning at each end point of a reference line a respective computer-synthesized camera, each providing a respective field view for each Imaging channel;

rendering M increments of imaging data for each imaging channel each increment of imaging data uniquely corresponding to a respective strip on each sub-screen; and combining each of the M increments of imaging data for each of the N sub-screens to seamlessly form cylindrical imaging data to be projected on the cylindrical screen, wherein M and N represent respective positive integer numbers.

16. The computer-readable medium of claim 15 wherein the rendering of the M increments of imaging data for each sub-screen is based on a parallax model using the reference line with each computer synthesized camera, said reference line selectively rotatable to be in parallel alignment relative to each respective plane defined by each strip in a corresponding sub-screen, and wherein selective rotation of the reference line comprises incrementally rotating the reference line by an angle based on the following equation:

$$\frac{\text{Cylindrical\_Span}}{M*N},$$

wherein "Cylindrical Span" represents the angular span of the cylindrical screen.

17. A computer-readable medium including instructions for causing a computer to process stereoscopic seamless imaging data for a cylindrical screen by:

arranging a cylindrical screen into N sub-screens, each sub-screen comprising M planar strips axially extending along a corresponding sub-screen;

rendering M increments of imaging data for each imaging channel, each increment of imaging data uniquely corresponding to a respective strip on each sub-screen:

re-rendering imaging data originally rendered for each imaging channel, said re-rendering performed relative to a computer-synthesized cylinder configured as the cylindrical screen, and texture-mapping the originally rendered sub-screen imaging data to generate new sub-screen imaging data substantially free of distortion; and combining each of the M increments of imaging data for each of the N sub-screens to seamlessly form cylindrical imaging data to be projected on the cylindrical screen, wherein M and N represent respective positive integer numbers.

18. The computer-readable medium of claim 15 further comprising seamlessly blending imaging data between adjacent sub-screens by applying, during an imaging-production stage, a predefined attenuation function over an area selected for overlapping between any two adjacent sub-screens, and, during a playback stage, overlapping the two adjacent sub-screens over the selected area so that pixels in that area are selectively attenuated based on attenuation values determined by the applied attenuation function.

19. A computerized stereoscopic imaging method comprising:

configuring a cylindrical screen into N sub-screens, each sub-screen comprising M planar strips axially extending along a corresponding sub-screen;

rendering M increments of imaging data for each imaging channel, each increment of imaging data uniquely corresponding to a respective strip on each sub-screen;

re-rendering imaging data originally rendered for each imaging channel, said re-rendering performed relative to a computer-synthesized cylinder configured as the cylindrical screen, and texture-mapping the originally rendered sub-screen imaging data to generate new sub-screen imaging data substantially free of distortion;

blending imaging data between adjacent sub-screens by applying, during an imaging-production stage, a predefined attenuation function over an area selected for overlapping between any two adjacent sub-screens, and, during a playback stage, overlapping the two adjacent sub-screens over the selected area so that pixels in that area are selectively attenuated based on attenuation values determined by the applied attenuation function; and combining each of the M increments of imaging data for each of the N sub-screens to seamlessly form cylindrical imaging data to be projected on the cylindrical screen, wherein M and N represent respective positive integer numbers.

20. A computer-readable medium including instructions far causing a computer to process stereoscopic seamless imaging data for a cylindrical screen by:

arranging a cylindrical screen into N sub-screens, each sub-screen comprising M planar strips axially extending along a corresponding sub-screen;

positioning at each end point of a reference line a respective computer-synthesized camera, each providing a respective field view far each imaging channel;

rendering M increments of imaging data for each imaging channel, each increment of imaging data uniquely corresponding to a respective strip on each sub-screen;

blending imaging data between adjacent sub-screens by applying, during an imaging-production stage, a predefined attenuation function over an area selected for overlapping between any two adjacent sub-screens, and, during a playback stage, overlapping the two adjacent sub-screens over the selected area so that pixels in that area are selectively attenuated based on attenuation values determined by the applied attenuation function; and combining each of the M increments of imaging data for each of the N sub-screens to seamlessly form cylindrical imaging data to be projected on the cylindrical screen, wherein M and N represent respective positive integer numbers.

* * * * *